(12) United States Patent
Yu et al.

(10) Patent No.: US 12,453,800 B2
(45) Date of Patent: Oct. 28, 2025

(54) MEDICAL SILICONE PRESSURE-SENSITIVE ADHESIVE COMPOSITION

(71) Applicants: ELKEM SILICONES SHANGHAI CO., LTD., Shanghai (CN); ELKEM SILICONES FRANCE SAS, Saint-Fons (FR)

(72) Inventors: Hengda Yu, Shanghai (CN); Yin Zhang, Shanghai (CN); Caroline Moine, Saint-Fons (FR)

(73) Assignees: ELKEM SILICONES SHANGHAI CO., LTD., Shanghai (CN); ELKEM SILICONES FRANCE SAS, Lyons (FR)

( * ) Notice: Subject to any disclaimer, the term of this patent is extended or adjusted under 35 U.S.C. 154(b) by 0 days.

(21) Appl. No.: 18/035,258

(22) PCT Filed: Nov. 3, 2020

(86) PCT No.: PCT/CN2020/126100
§ 371 (c)(1),
(2) Date: May 3, 2023

(87) PCT Pub. No.: WO2022/094748
PCT Pub. Date: May 12, 2022

(65) Prior Publication Data
US 2024/0009343 A1   Jan. 11, 2024

(51) Int. Cl.
*A61L 24/04* (2006.01)

(52) U.S. Cl.
CPC .......... *A61L 24/043* (2013.01); *A61L 2420/06* (2013.01)

(58) Field of Classification Search
CPC ....... A61L 15/58; A61L 2420/06; C08L 83/04
See application file for complete search history.

(56) References Cited

U.S. PATENT DOCUMENTS

| | | |
|---|---|---|
| 11,051,989 B2 | 7/2021 | Moine et al. |
| 11,090,406 B1 * | 8/2021 | Cros ..................... A61M 25/02 |
| 11,331,407 B2 | 5/2022 | Moine et al. |
| 2009/0117310 A1 | 5/2009 | Ellringmann et al. |
| 2019/0099517 A1 * | 4/2019 | Moine ..................... A61L 15/26 |

FOREIGN PATENT DOCUMENTS

| | | | | |
|---|---|---|---|---|
| FR | 2 824 839 A1 | 11/2002 | | |
| JP | 6-172718 A | 6/1994 | | |
| JP | 2009-233316 A | 10/2009 | | |
| JP | 2019516811 A | 6/2019 | | |
| JP | 2020011919 A | 1/2020 | | |
| KR | 10-2004-0082725 A | 9/2004 | | |
| KR | 101731612 A | 5/2017 | | |
| WO | WO-2005102403 A1 * | 11/2005 | ............. | A61L 15/58 |
| WO | 2008057155 A1 | 5/2008 | | |
| WO | WO-2017051083 A1 * | 3/2017 | ......... | A61F 13/0253 |
| WO | WO-2017158250 A1 * | 9/2017 | ............. | A61L 15/26 |
| WO | 2019/008238 A1 | 1/2019 | | |
| WO | 2019/045830 A1 | 3/2019 | | |
| WO | 2020/055505 A1 | 3/2020 | | |
| WO | 2020/099999 A1 | 5/2020 | | |
| WO | WO-2020186129 A1 * | 9/2020 | ............. | C08G 77/08 |

OTHER PUBLICATIONS

International Search Report and Written Opinion dated Jul. 30, 2021, issued in corresponding International Patent Application No. PCT/CN2020/126100, 8 pages.
Notice of Reasons for Refusal dated May 17, 2024, issued in corresponding Japanese Patent Application No. 2023-527116, with its English translation, 8 pages.

* cited by examiner

*Primary Examiner* — Mark S Kaucher
(74) *Attorney, Agent, or Firm* — SHEPPARD, MULLIN, RICHTER & HAMPTON LLP

(57) ABSTRACT

A medical silicone pressure-sensitive adhesive composition is described that includes: organopolysiloxane A, organopolysiloxane resin B, organopolysiloxane crosslinker XL, organopolysiloxane extender CE, hydrosilylation catalyst D, solvent E and hydrosilylation inhibitor F, wherein the organopolysiloxanes A, CE and XL are chosen such that the molar ratio RHAlk=tH/tAlk is 3.5 to 8; and $nH^{XL}/nH^{CE}$ is within 0.13 to 11, with:—tH=number of moles of hydrogen atom directly bonded to a silicon atom of the organopolysiloxanes XL and CE;—tAlk=number of moles of alkenyl directly bonded to a silicon atom of the organopolysiloxane A;—$nH^{XL}$=number of moles of hydrogen atom directly bonded to a silicon atom of the organopolysiloxane XL;—$nH^{CE}$=number of moles of hydrogen atom directly bonded to a silicon atom of the organopolysiloxane CE. Also described, is a method for coating a substrate by using the medical silicone pressure-sensitive adhesive composition, a coated substrate obtainable according to the method, and also a skin-adhesive article made by using the medical silicone pressure-sensitive adhesive composition.

36 Claims, No Drawings

MEDICAL SILICONE PRESSURE-SENSITIVE ADHESIVE COMPOSITION

CROSS-REFERENCE TO PRIOR APPLICATIONS

This application is a National Stage of PCT/CN2020/126100, filed on Nov. 3, 2020, and designating the United States (published on May 12, 2022, as WO 2022/094748A1) hereby expressly incorporated by reference in its entirety and assigned to the assignee hereof.

TECHNICAL FIELD

The field of the present invention is that of a medical pressure-sensitive adhesive (PSA). Specifically, the present invention relates to a medical silicone pressure-sensitive adhesive composition, a method for coating a substrate by using the medical silicone pressure-sensitive adhesive composition, a coated substrate obtainable according to the method, and also to a skin-adhesive article by using the medical silicone pressure-sensitive adhesive composition.

BACKGROUND ART

PSA is an abbreviation for the term "a pressure-sensitive adhesive", which is well known in the art and widely used in various applications, especially in medical applications. Now in the medical market, most of skin touch products such as tape, patch and bandage etc. are prepared by acrylic based PSA. However, acrylic based PSA has some disadvantages such as weak sweat (water) resistance, weak biocompatibility, and high sensitization rate for human skin, especially for infants and children.

A silicone-based PSA is also widely used in medical applications for use against the skin or in contact with the skin. A silicone-based PSA is capable of adhering to a surface simply by contact or under the effect of a light pressure. It has significant advantages over acrylic based PSA. A silicone-based PSA exhibits advantageous properties for medical applications due to its air permeability, water resistance, low irritation and biocompatibility. For example, a silicone-based PSA is suited to the enhanced requirements of novel medical applications due to its biocompatibility and its permeability, making possible the diffusion of oxygen, carbon dioxide and water vapor, which renders it perfectly suited to medical applications in which enhanced aeration is necessary.

WO2017158249A1 describes a silicone gel that can be used as a skin adhesive. The silicone gel has good adhesion on polyester or polyurethane substrate and has better tack on the skin than the prior art gel. The silicone gel, due to its intrinsic natures, lacks adhesion to moist skin and thus is beneficial for wound care applications because it can avoid secondary damage to the wound during use of a dressing. However, for medical materials attached on the skin non-traumatically, a moist environment or sweating often causes the gel to lose its tack and then peels off.

KR101731612B1 describes a medical silicone pressure-sensitive adhesive composition based on a vinyl silicone resin, which, compared with a traditional acrylate pressure-sensitive adhesive, is not harmful to a human skin, has excellent adhesive force including initial adhesive force and re-adhesive force, and also has excellent absorptivity and wound healing effects. However, this document does not study the medical silicone pressure sensitive adhesive based on hydroxy silicone resin, nor does it consider the effect of high molecular weight terminal vinyl polysiloxane. Moreover, the influence of factors such as XL viscosity, tH/tAlk ratio, $nH^{XL}/nH^{CE}$ ratio on the application performance of medical silicone pressure sensitive adhesives has not been systematically studied and clearly defined. The residue of the pressure-sensitive adhesive on the skin after wearing was not evaluated.

WO2020099999A1 describes a medical silicone pressure-sensitive adhesive having an enhanced adhesion force while minimizing skin damage and pain during removal of the adhesive. In this document, the condensation product is formed by the reaction between the polyorganosiloxane containing terminal hydroxyl groups and the silicate resin, and then the non-reactive polyorganosiloxane is mixed. In the subsequent tape production process, an electron beam is used to promote the crosslinking of the non-reactive polyorganosiloxane, thereby forming a layer of pressure-sensitive adhesive on the substrate. In this document, the production process of PSA is complicated, and the control of the condensation reaction conditions has a great influence on the product quality. In the subsequent curing process, an electron beam is needed, and the equipment is relatively expensive. Further, the properties of the condensation type PSA have been determined by the previous condensation reaction, which limits the subsequent applications.

Thus, there is always a need to obtain a silicone-based pressure-sensitive adhesive composition having excellent comprehensive properties suitable for medical applications.

CONTENTS OF THE INVENTION

The present invention has solved the problems of prior art.

Specifically, it is an object of the present invention to provide a medical silicone pressure-sensitive adhesive composition, which, in addition to maintaining the inherent properties of silicone based PSA such as air permeability, water resistance, low irritation and biocompatibility, has adhesion comparable to the acrylic based PSA and thus can replace the acrylic based PSA more and more in the medical field and finds some new applications where the acrylic based PSA is not suitable.

The silicone-based pressure-sensitive adhesive composition according to the present invention which, after crosslinking, provides excellent comprehensive properties suitable for medical applications, for example, excellent overall properties of easy to tear, invisible residual on skin, good anchorage on substrate, good peel adhesion, good tack, suitable release force and acceptable reposition property.

The silicone-based pressure-sensitive adhesive (PSA) composition according to the present invention which, after crosslinking, provides a silicone-based pressure-sensitive adhesive (PSA) having good anchorage on substrates, for example on substrates made of paper, PU (polyurethane), TPU (thermoplastic polyurethane), non-woven cloth and elastic cloth; and good adhesion (or "tack") on the skin, while avoiding the discomfort brought about during the detaching of such PSA from the skin.

Therefore, the present invention relates to a medical silicone pressure-sensitive adhesive composition comprising:

at least one organopolysiloxane A comprising, per molecule, at least two $C_2$ to $C_6$ alkenyl radicals each bonded to a silicon atom, at least one organopolysiloxane resin B comprising OH group(s) bonded to silicone atoms, at least one organopolysiloxane crosslinker XL having at least three hydrogen atoms bonded to silicone atoms, at least one organopolysiloxane extender CE having exactly two terminal-hydrogen atom bonded to silicone atoms,
at least one hydrosilylation catalyst D,
at least one solvent E,
at least one hydrosilylation inhibitor F,
wherein the organopolysiloxanes A, CE and XL are chosen such that the molar ratio RHAlk=tH/tAlk is comprised from 3.5 to 8; and $nH^{XL}/nH^{CE}$ is comprised from 0.13 to 11, with:
tH=number of moles of hydrogen atom directly bonded to a silicon atom of the organopolysiloxanes XL and CE;
tAlk=number of moles of alkenyl directly bonded to a silicon atom of the organopolysiloxane A;
$nH^{XL}$=number of moles of hydrogen atom directly bonded to a silicon atom of the organopolysiloxane XL;
$nH^{CE}$=number of moles of hydrogen atom directly bonded to a silicon atom of the organopolysiloxane CE.

The medical silicone pressure-sensitive adhesive composition according to the present invention is a precursor of a silicone pressure-sensitive adhesive G and is crosslinkable by hydrosilylation.

It is another object of the present invention to provide a skin-adhesive article comprising a substrate coated, continuously or noncontinuously, on at least one of the two faces with a silicone pressure-sensitive adhesive obtained by crosslinking a medical silicone pressure-sensitive adhesive composition comprising:
at least one organopolysiloxane A comprising, per molecule, at least two $C_2$ to $C_6$ alkenyl radicals each bonded to a silicon atom,
at least one organopolysiloxane resin B comprising OH group(s) bonded to silicone atoms,
at least one organopolysiloxane crosslinker XL having at least three hydrogen atoms bonded to silicone atoms,
at least one organopolysiloxane extender CE having exactly two terminal-hydrogen atom bonded to silicone atoms,
at least one hydrosilylation catalyst D,
at least one solvent E,
at least one hydrosilylation inhibitor F,
wherein the organopolysiloxanes A, CE and XL are chosen such that the molar ratio RHAlk=tH/tAlk is comprised from 3.5 to 8; and $nH^{XL}/nH^{CE}$ is comprised from 0.13 to 11, with:
tH=number of moles of hydrogen atom directly bonded to a silicon atom of the organopolysiloxanes XL and CE;
tAlk=number of moles of alkenyl directly bonded to a silicon atom of the organopolysiloxane A;
$nH^{XL}$=number of moles of hydrogen atom directly bonded to a silicon atom of the organopolysiloxane XL;
$nH^{CE}$=number of moles of hydrogen atom directly bonded to a silicon atom of the organopolysiloxane CE.

It is still another object of the present invention to provide a method for coating a substrate by using the medical silicone pressure-sensitive adhesive composition according to the present invention.

It is a further object of the present invention to provide a coated substrate obtainable by the method according to the present invention.

It is still another object of the present invention to provide a substrate coated with a silicone pressure-sensitive adhesive G obtained by crosslinking the silicone pressure-sensitive adhesive composition according to the present invention.

The inventors of the present invention have employed significant research means and carried out numerous experiments in order to achieve these objects among others. It was found by the inventors that by choosing the organopolysiloxanes A, CE and XL such that the molar ratio RHAlk=tH/tAlk is comprised from 3.5 to 8; and $nH^{XL}/nH^{CE}$ is comprised from 0.13 to 11, a medical silicone pressure-sensitive adhesive composition is obtained, which, after crosslinking, provides excellent comprehensive properties suitable for medical applications, for example, excellent overall properties of easy to tear, invisible residual on skin, good anchorage on substrate, good peel adhesion, good tack, suitable release force and acceptable reposition property.

The inventors of the present invention also found that by choosing the components CE and XL such that the ratio $nH^{XL}/nH^{CE}$ is within a specific range according to the final use, the medical silicone pressure-sensitive adhesive composition may be specifically applied to various specific substrates, in particular substrates made of paper, TPU, non-woven cloth and elastic cloth, resulting in good performances in the PSA's final application.

Component A—Organopolysiloxane A

The component A may be at least two $C_2$ to $C_6$ alkenyls substituted silicone polymer used as a backbone in the composition.

According to one embodiment, the organopolysiloxane A is an organopolysiloxane gum having a consistency at 25° C. of between 200 mm/10 and 2000 mm/10, preferably between 300 mm/10 and 1800 mm/10, more preferably between 500 mm/10 and 1500 mm/10.

According to one embodiment, the organopolysiloxane A is an organopolysiloxane gum having a weight average molecular weight Mw between 260000 g/mol and 1000000 g/mol, preferably between 400000 g/mol and 1000000 g/mol, and more preferably between 600000 g/mol and 900000 g/mol. The weight-average molecular weight Mw is determined by gel permeation chromatography with polystyrene as standard.

According to one embodiment, the organopolysiloxane A is an organopolysiloxane gum exhibiting a viscosity greater than 600 000 mPa·s at 25° C., preferably greater than 1 000 000 mPa·s at 25° C.

According to another embodiment, the medical silicone pressure-sensitive adhesive composition according to the invention comprises at least two organopolysiloxanes A, in which the first organopolysiloxane A' is the gum as defined above, and the second organopolysiloxane A" is an oil having a dynamic viscosity of 10 to 500 000 mPa·s at 25° C., preferably 100 to 100 000 mPa·s at 25° C., more preferably 10 000 to 100 000 mPa·s at 25° C. The organopolysiloxane A" may be linear or branched, and may have alkenyl content of 0.05 wt % to 0.5 wt %, based on the total weight of component A".

All the viscosities under consideration in the present description correspond to a "Newtonian" dynamic viscosity magnitude at 25° C., i.e. the dynamic viscosity which is measured, in a manner that is known per se, with a Brookfield viscometer at a shear rate gradient that is low enough for the measured viscosity to be independent of the rate gradient.

The consistency or penetrability of a gum is determined at 25° C. by means of a penetrometer of PNR12 type or equivalent model which makes it possible to apply, to the sample, a cylindrical head under standardized conditions. The penetrability of a gum is the depth, expressed in tenths of a millimeter, to which a calibrated cylinder penetrates into the sample over one minute. To this end, a sample of gum is introduced into an aluminum receptacle with a diameter of 40 mm and with a height of 60 mm. The cylindrical head, made of bronze or of brass, measures 6.35 mm in diameter and 4.76 mm in height and is carried by a metal rod with a length of 51 mm and with a diameter of 3 mm which fits the penetrometer. This rod is ballasted with an excess load of 100 g. The total weight of the assembly is 151.8 g, including 4.3 g for the cylindrical part and its support rod. The receptacle containing the sample of gum is placed in the bath thermostatically controlled at 25±0.5° C., for at least 30 min. The measurement is carried out by following the instructions of the manufacturer. The values of the depth (V), in tenths of a millimeter, and of the time (t), in seconds, to reach this depth are shown on the device. The penetrability is equal to 60 V/t, expressed in tenths of a millimeter per minute.

Preferably, the at least one organopolysiloxane A may comprise:

(I) at least two siloxyl units of formula (A1):

$(Y)_a(Z)_b SiO_{(4-(a+b))/2}$   (A1)

in which:
 Y represents a monovalent radical containing from 2 to 6 carbon atoms, having at least two alkenyl group;
 Z represents a monovalent radical containing from 1 to 20 carbon atoms and not comprising an alkenyl group;
 a and b represent integers, a being 1, 2 or 3, b being 0, 1 or 2 and (a+b) being 1, 2 or 3;

(ii) and may optionally comprise other siloxyl units of formula (A2):

$(Z)_c SiO_{(4-c)/2}$   (A2)

in which:
 Z has the same meaning as above, and
 c represents an integer which is 1, 2 or 3.

According to the invention, it is judicious that, for definition of the organopolysiloxane A in the formula (A1), the symbol a can preferably be equal to 1 or 2, and even more preferentially 1. Furthermore, in formula (A1) and in formula (A2), the symbol Z may preferentially represent a monovalent radical chosen from the group formed by an alkyl group containing 1 to 8 carbon atoms, optionally substituted with at least one halogen atom, and a $C_6$ to $C_{10}$ aryl group. Z may advantageously represent a monovalent radical chosen from the group formed by: methyl, ethyl, propyl, 3,3,3-trifluoropropyl, xylyl, tolyl and phenyl. In addition, in formula (A1), the symbol Y may advantageously represent a radical chosen from the group consisting of vinyl, propenyl, 3-butenyl and 5-hexenyl. Preferably, the symbol Y is a vinyl and the symbol Z is a methyl.

The organopolysiloxane A may have a linear or branched structure, preferably a linear structure. When it is linear organopolysiloxanes, it can essentially consist:
 of siloxyl units "D" chosen from the units of formulae $(Y)_2SiO_{2/2}$, $(Y)(Z)SiO_{2/2}$ and $(Z)_2SiO_{2/2}$; and
 of siloxyl units "M" chosen from the units of formulae $(Y)_3SiO_{1/2}$, $(Y)_2(Z)SiO_{1/2}$ $(Y)(Z)_2SiO_{1/2}$ and $(Z)_3SiO_{2/2}$,
 in which formulae, the symbols Y and Z are as defined above.

Preferably, the linear organopolysiloxane A has a polymerization degree in a range of 2000 to 10000, more preferably from 2000 to 8000 and more preferably from 2000 to 5000.

By way of example of units "D", mention may be made of dimethylsiloxy, methylphenylsiloxy, methylvinylsiloxy, methylbutenylsiloxy, methylhexenylsiloxy, methyldecenylsiloxy and methyldecadienylsiloxy groups.

By way of example of units "M", mention may be made of trimethylsiloxy, dimethylphenylsiloxy, dimethylvinylsiloxy and dimethylhexenylsiloxy groups.

The organopolysiloxane A, in particular when it is linear, may be a polymer preferably having a weight average molecular weight Mw between 400 000 g/mol and 1 000 000 g/mol, and preferentially between 600 000 g/mol and 900 000 g/mol.

As examples of organopolysiloxane A that are of use, mention may be made of:
 polydimethylsiloxanes comprising dimethylvinylsilyl end groups;
 poly(methylphenylsiloxane-co-dimethylsiloxane)s comprising dimethylvinylsilyl end groups;
 poly(vinylmethylsiloxane-co-dimethylsiloxane)s comprising dimethylvinylsilyl end groups,
 poly(dimethylsiloxane-co-vinylmethylsiloxane)s comprising trimethylsilyl end groups;

The organopolysiloxanes A which are polydimethylsiloxanes comprising dimethylvinylsilyl end groups having a weight average molecular weight Mw of between 260 000 g/mol and 1 000 000 g/mol, and preferably of between 600 000 g/mol and 900 000 g/mol, are particularly advantageous. The organopolysiloxanes A which are particularly advantageous are those of formule $M^{Vi}D_aM^{Vi}$ in which :
 $M^{Vi}$=siloxyl unit of formula: $(vinyl)(CH_3)_2SiO_{1/2}$
 D=siloxyl unit of formula: $(CH_3)_2SiO_{2/2}$, and
 a is a number between 2000 and 6000, and preferably between 3000 and 5500.

The organopolysiloxane A may be used in an amount from 15 to 45 wt %, preferably from 20 to 35 wt % based on the total amount of components A+B+XL+CE.

According to an embodiment, the organopolysiloxane A has an alkenyl content between 0.001% to 0.5 wt %, preferably 0.005% to 0.025 wt %, more preferably 0.008% to 0.018 wt %, based on the total weight of the organopolysiloxane A.

Preferably, the organopolysiloxane A may be selected from dimethylvinyl-terminated polydimethylsiloxane, dimethylvinyl-terminated polydimethylmethylvinylsiloxane, trimethyl-terminated polydimethylmethylvinylsiloxane, more preferably selected from dimethylvinyl-terminated polydimethylsiloxane.

Component B—Organopolysiloxane Resin B Comprising Hydroxyl Groups Bonded to Si Atom Use is made, in order to describe the polyorganosiloxanes, of the nomenclature known in the field of silicones and which uses, in order to describe siloxy units, the following letters: M, D, T and Q. The letter M represents the monofunctional unit of formula $(R^1)_3SiO_{1/2}$, the silicon atom being connected to just one oxygen atom in the polymer comprising this unit. The letter D means a difunctional unit $(R^1)_2SiO_{2/2}$ in which the silicon atom is connected to two oxygen atoms. The letter T represents a trifunctional unit of formula $(R^1)SiO_{3/2}$, in which the silicon atom is connected to three oxygen atoms. The letter Q represents a trifunctional unit of formula $SiO_{4/2}$ in which the silicon atom is connected to four oxygen atoms. The symbol $R^1$ has the same definition as the symbol $R^2$. The M, D and T units can be functionalized. Reference is then made to M, D and T units, while specifying the specific radicals.

The organopolysiloxane resin B comprising hydroxyl groups bonded to Si atom can be chosen from conventional organopolysiloxane resins, among which may be mentioned organosilicon resins prepared by cohydrolysis and cocondensation of chlorosilanes chosen from the group consisting of those of formulae $(R^2)_3SiCl$, $(R^2)_2Si(Cl)_2$, $R^2Si(Cl)_3$ and Si(Cl)$_4$. These resins are branched organopolysiloxane oligomers or polymers which are well known and which are commercially available. They exhibit, in their structure, at least two different siloxyl units chosen from those of formulae (R$^2$)$_3$SiO$_{1/2}$ (M unit), (R$^2$)$_2$SiO$_{2/2}$ (D unit), R$^2$SiO$_{3/2}$ (T unit) and SiO$_{4/2}$ (Q unit), at least one of these units being a T or Q unit. The R$^2$ radicals are distributed so that the resins comprise from approximately 0.8 to 1.8 R$^2$ radicals per silicon atom. Furthermore, these resins are not completely condensed and contain OH groups. The R$^2$ radicals are identical or different and are chosen from linear or branched C$_1$-C$_6$ alkyl radicals, C$_2$-C$_4$ alkenyl radicals, phenyl or 3,3,3-trifluoropropyl. Mention may be made, for example, as alkyl R$^2$ radicals, of the methyl, ethyl, isopropyl, tert-butyl and n-hexyl radicals and, as alkenyl radicals, of the vinyl or allyl groups. Preferably, the R$^2$ radicals are methyl or hydroxyl groups.

According to a specific embodiment, the organopolysiloxane resin B comprising hydroxyl groups is chosen from the group consisting of:

a) hydroxylated silicone resins of MQ$^{(OH)}$ type which are copolymers comprising M and Q$^{(OH)}$ siloxy units of following formulae:

M=R$^3$R$^4$R$^5$SiO$_{1/2}$, and

Q$^{(OH)}$=(OH)SiO$_{3/2}$, with optionally the presence of siloxy unit Q=SiO$_{4/2}$ b) hydroxlyated silicone resins of MD$^{Vi}$Q$^{(OH)}$ type which are copolymers comprising M, D$^{Vi}$ and Q$^{(OH)}$ siloxy units of following formulae:

M=R$^3$R$^4$R$^5$SiO$_{1/2}$,

D$^{Vi}$=(Vi)(R$^3$)SiO$_{2/2}$,and

Q$^{(OH)}$=(OH)SiO$_{2/2}$, with optionally the presence of siloxy unit Q=SiO$_{4/2}$ c) hydroxlyated silicone resins of MM$^{Vi}$Q$^{(OH)}$ type which are copolymers comprising M, M$^{Vi}$ and Q$^{(OH)}$ siloxy units of following formulae:

M=R$^3$R$^4$R$^5$SiO$_{1/2}$,

M$^{Vi}$=(Vi)(R$^3$)(R$^4$)SiO$_{2/2}$, and

Q$^{(OH)}$=(OH)SiO$_{3/2}$, with optionally the presence of siloxy unit Q=SiO$_{4/2}$ d) hydroxlyated silicone resins of MDT$^{(OH)}$T type which are copolymers comprising M, D, T$^{(OH)}$ and T siloxy units of following formulae:

M=R$^3$R$^4$R$^5$SiO$_{1/2}$,

D=R$^3$R$^4$SiO$_{2/2}$,

T$^{(OH)}$=(OH)R$^3$SiO$_{2/2}$,

T=R$^3$SiO$_{3/2}$,and e) hydroxlyated silicone resins of DT$^{(OH)}$T type which are copolymers comprising D, T$^{(OH)}$ and T siloxy units of following formulae:

D=R$^3$R$^4$SiO$_{2/2}$,

T$^{(OH)}$=(OH)R$^3$SiO$_{2/2}$,

T=R$^3$SiO$_{3/2}$,and in which formulae the symbol Vi=a vinyl group and the symbols R$^3$, R$^4$ and R$^5$ are chosen, independently of one another, from:

the linear or branched alkyl groups having from 1 to 8 carbon atoms and optionally substituted by one or more halogen atoms, and preferably chosen from the group consisting of the methyl, ethyl, isopropyl, tert-butyl and n-hexyl groups, and aryl or alkylaryl groups having from 6 to 14 carbon atoms inclusive, and preferably chosen from the group consisting of the phenyl, xylyl and tolyl groups.

According to a preferred embodiment, mention may be made, as examples of organopolysiloxane resin B, selected from at least one of MQ resins, MDQ resins, DT resins and MDT resins, it being possible for the OH groups to be carried by the Q and/or T units.

According to another preferred embodiment, the organopolysiloxane resin B is a hydroxylated silicone resin of MQ$^{(OH)}$, NAQQ$^{(OH)}$ or MM$^{Vi}$Q$^{(OH)}$ type and contains from 0.1 to 4 wt %, preferably from 0.3 to 2.0 wt %, more preferably from 0.5 to1.5 wt % of hydroxyl group with respect to the dry weight of organopolysiloxane resin B. Preferably, the ratio of M units and Q units is from 0.5 to 1.2, preferably from 0.6 to 0.9. Component B may have a weight average molecular weight Mw of from 3000 g/mol to 10000 g/mol, preferably from 4000 g/mol to 6000 g/mol.

In this composition of the present invention, the organopolysiloxane resin B may be used as a tackifier.

The organopolysiloxane resin B may be used in an amount from 15 to 45 wt %, preferably from 25 to 40 wt %, based on the total amount of the components A+B+XL+CE.

Preferably, the weight ratio between the component B and the component A may be from 0.8 to 2.5, preferably 1.0 to 2.0.

Component XL—Organopolysiloxane Crosslinker XL

The component XL may be titled as a crosslinker, which is an organopolysiloxane having at least three hydrogen atoms bonded to Si.

For example, the organohydrosiloxane crosslinker XL according to the present invention may comprise:

at least three siloxyl units of formula (XL-1):

(H)(L)$_e$SiO$_{(3-e)/2}$   (XL-1)

in which the symbol H represents a hydrogen atom, the symbol L represents an alkyl having from 1 to 8 carbon atoms inclusive or a C$_6$ to C$_{10}$ aryl, and the symbol e is equal to 0, 1 or 2; and optionally other siloxyl units of formula (XL-2):

(L)$_g$SiO$_{(4-g)/2}$   (XL-2)

in which the symbol L represents an alkyl having from 1 to 8 carbon atoms inclusive or a C$_6$ to C$_{10}$ aryl and the symbol g is equal to 0, 1, 2 or 3, and with the condition according to which the organopolysiloxane XL contains between 0.5% and 15.0% by weight of Si—H function per polymer, preferably between 1.0% and 12.5% by weight of Si—H function per polymer, and even more preferentially between 1.5% and 10.0% by weight of Si—H function per polymer.

As organopolysiloxane XL which has a crosslinking function and which is of use according to the invention, mention may be made of those of formulae M$^H$D$_x$D$_w$$^H$M$^H$, M$^H$D$_x$D$_y$$^H$M and M D$_x$D$_z$M, in which formulae:

M$^H$=siloxyl unit of formula: (H)(CH$_3$)$_2$SiO$_{1/2}$
D$^H$=siloxy unit of formula: (H)(CH$_3$) SiO$_{2/2}$
D=siloxyl unit of formula: (CH$_3$)$_2$SiO$_{2/2}$, and M=siloxyl unit of formula: $(CH_3)_3SiO_{1/2}$
with:
- x is a number between 0 and 500, preferably between 2 and 250 and even more preferentially between 5 and 80;
- w is a number between 1 and 500, preferably between 1 and 250 or between 1 and 100 and even more preferentially between 1 and 70;
- y is a number between 2 and 500, preferably between 3 and 250 or between 2 and 100 and even more preferentially between 2 and 70; and
- z is a number between 3 and 500, preferably between 3 and 250 or between 3 and 100 and even more preferentially between 3 and 70, and
- comprising between 0.5% and 15.0% by weight of Si—H function per polymer, preferably between 1.0% and 12.5% by weight of Si—H function per polymer, and even more preferentially between 1.5% and 10.0% by weight of Si—H function per polymer.

By adjusting the viscosity of the component XL, the medical silicone pressure-sensitive adhesive composition may be more specifically applied to various specific substrates, resulting in good performances in the PSA's final application.

The component XL may have a dynamic viscosity of 40 to 1000 mPa·s at 25° C., preferably 50 to 750 mPa·s at 25° C., more preferably 60 to 500 mPa·s at 25° C. If the viscosity of the component XL is lower than 40 mPa·s at 25° C., the cohesion of cured PSA is too strong to tear apart easily, and strong cohesion causes so weak adhesion to the substrate that the cured PSA layer would leave piece residual on the skin when it is peeled off.

The component XL may have Si—H content of 0.5 wt % to 15 wt %, preferably 1.0 wt % to 12.5 wt %, more preferably 1.5 wt % to 10.0 wt %, based on the total weight of component XL.

Preferably, the organopolysiloxane crosslinker XL may be trimethylsiloxy-terminated polymethylhydrogensiloxane, or dimethylhydrogen-terminated polymethylhydrogensiloxane.

Component CE—Organopolysiloxane Extender CE

The component CE may be titled as an extender, which is an organopolysiloxane having exactly two terminal-hydrogen atoms bonded to Si.

For example, the organohydrosiloxane extender CE according to the present invention may comprise:
- two siloxyl end units, which may be identical or different, of formula (CE-1):

$(H)_p(R^6)_q SiO_{1/2}$     (CE-1)

in which:
the symbol $R^6$ corresponds to a $C_1$ to C8 alkyl group or to a $C_6$ to $C_{10}$ aryl group;
and the symbol H represents a hydrogen atom, with p=1, q=2;
at least one siloxyl unit of formula (CE-2):

$(H)_n(R^7)_m SiO_{2/2}$     (CE-2)

in which the radical $R^7$ corresponds to a $C_1$ to $C_8$ alkyl group or a $C_6$ to $C_{10}$ aryl group, the symbol H represents a hydrogen atom and with n=0, m=2, and
with the condition according to which the organopolysiloxane CE contains two hydrogen atoms each one bonded to a different silicon atom per polymer, and preferably the organopolysiloxane CE contains, per polymer, two siloxyl units of formula (CE-1) in which p=1 and at least one siloxyl unit of formula (CE-2) in which n=0.

As examples of organopolysiloxane CE which has a "chain extender" function, mention may be made of polydimethylsiloxanes comprising dimethylhydrosilyl end groups having a dynamic viscosity at 25° C. of between 1 mPa·s at 25° C. and 1000 mPa·s at 25° C., preferably of between 5 mPa·s at 25° C. and 500 mPa·s at 25° C., even more preferentially of between 5 and 300 mPa·s at 25° C. Particularly advantageous organopolysiloxanes CE are of formula $M^H D_x M^H$ in which:
$M^H$=siloxyl unit of formula: $(H)(CH_3)_2SiO_{1/2}$
D=siloxyl unit of formula: $(CH_3)_2SiO_{2/2}$, and
x is an integer between 1 and 200, preferably between 1 and 150 and even more preferentially between 3 and 120.

The organopolysiloxane CE is described as "chain extender" since it has the presumed effect of increasing the mesh size of the network during the crosslinking when the SiH reactive functions are at the chain end.

The component CE may have a dynamic viscosity of 1 to 1000 mPa·s at 25° C., preferably 5 to 500 mPa·s at 25° C., more preferably 5 to 300 mPa·s at 25° C.

The component CE may have Si—H content of 0.2 wt % to 10wt %, preferably 0.3 wt % to 8.0 wt %, more preferably 0.4 wt % to 6.0 wt %, based on the total weight of component CE.

Preferably, the organopolysiloxane extender CE may be dimethylhydrogen-terminated polydimethylsiloxane.

The organopolysiloxane crosslinker XL and the organopolysiloxane extender CE may be introduced in the composition according to the present invention in any suitable form. For example, the organopolysiloxane crosslinker XL and the organopolysiloxane extender CE can be used separately or as a mixture.

When the organopolysiloxane crosslinker XL and the organopolysiloxane extender CE are introduced in the form of a mixture, said mixture is introduced in an amount from 1.0 to 5.0 wt %, preferably from 1.0 to 2.0 wt % based on the total amount of components A+B+XL+CE. The mixture may have a dynamic viscosity of at least 70 mPa·s at 25° C.

Component D—Hydrosilylation Catalyst D

As hydrosilylation catalyst D that is useful according to the invention, mention may be made of the compounds of a metal belonging to the group of platinum which is well known to the person skilled in the art. The metals of the platinum group are those known as platinoids, a name which groups together, in addition to platinum, ruthenium, rhodium, palladium, osmium and iridium. The compounds of platinum and of rhodium are preferably used. Use may in particular be made of the complexes of platinum and of an organic product described in patents US-A-3 159 601, US-A-3 159 602 and US-A-3 220 972 and European patents EP-A-0 057 459, EP-A-0 188 978 and EP-A-0 190 530, and the complexes of platinum and of vinyl organosiloxanes described in patent US-A-3 419 593. The catalyst generally preferred is platinum. By way of examples, mention may be made of black platinum, chloroplatinic acid, a chloroplatinic acid modified with an alcohol, a complex of chloroplatinic acid with an olefin, an aldehyde, a vinylsiloxane or an acetylenic alcohol, among others. The Karstedt solution or complex, as described in patent US-A-3 775 452, chloroplatinic acid hexahydrate or a platinum catalyst comprising carbene ligands is preferred.

Preferably, the component D is a solution of platinum complex in vinyl-terminated polydimethylsiloxane.

Component E—Solvent E

According to one embodiment of the invention, the solvent E is chosen from the group consisting of: aliphatic $C_6$ to $C_{16}$ hydrocarbons, polydimethylsiloxanes comprising a trimethylsilyl end group having a viscosity of 0.65 to 5 mPa·s at 25° C., cyclic polydimethylsiloxanes, (3-octyl) heptamethyltrisiloxane, toluene, xylene, a $C_1$ to $C_8$ alkyl ester, a $C_2$ to $C_4$ carboxylic acid and their mixtures.

In particular, the solvent E is at least one solvent. The solvent E is at least one medical approved solvent. For example, it is selected from toluene, xylene, heptane, ethyl acetate, more preferably ethyl acetate for healthcare application.

The amount of solvent E is from 30 wt % to 80 wt %, preferably from 40 wt % to 70 wt %, based on the total weight of composition.

Component F—Hydrosilylation Inhibitor F

Hydrosilylation inhibitor F is used in the present composition.

Mention may be made, as example of inhibitor of the hydrosilylation reaction of use according to the invention, of that chosen from α-acetylenic alcohols, α,α'-acetylenic diesters, ene-yne conjugated compounds, α-acetylenic ketones, acrylonitriles, maleates, fumarates and the mixtures of these. These compounds, capable of performing the role of hydrosilylation inhibitor, are well known to the person skilled in the art. They can be used alone or as mixtures.

An inhibitor of α-acetylenic alcohol type can be chosen from the compounds of following formula (F1):

$(R^8)(R^9)C(OH)—C≡CH$ (F1)

in which:
the $R^8$ group represents an alkyl group, a cycloalkyl group, a (cycloalkyl)alkyl group, a $C_6$ to $C_{10}$ aryl group or a $C_7$ to $C_{18}$ arylalkyl group,
the $R^9$ group represents a hydrogen atom, an alkyl group, a cycloalkyl group, a (cycloalkyl)alkyl group, a $C_6$ to $C_{10}$ aryl group or a $C_7$ to C18 arylalkyl group,
or else $R^8$ and $R^9$ constitute, together with carbon atom to which they are bonded, a 5-, 6-, 7- or 8-membered aliphatic ring optionally substituted one or more times.

According to the formula (F1):
the term "alkyl" is understood to mean a saturated hydrocarbon chain containing from 1 to 20 carbon atoms, preferably from 1 to 8 carbon atoms. An alkyl group can be chosen from the group consisting of methyl, ethyl, isopropyl, n-propyl, tert-butyl, isobutyl, n-butyl, n-pentyl, isoamyl and 1,1-dimethylpropyl;
the term "cycloalkyl" is understood to mean, according to the invention, a saturated monocyclic or polycyclic, preferably monocyclic or bicyclic, hydrocarbon group containing from 3 to 20 carbon atoms, preferably from 5 to 8 carbon atoms. When the cycloalkyl group is polycyclic, the multiple cyclic nuclei can be attached to one another via a covalent bond and/or via a spirane atom and/or be condensed to one another. A cycloalkyl group can be chosen from the group consisting of cyclopropyl, cyclobutyl, cyclopentyl, cyclohexyl, cycloheptyl, cyclooctyl, adamantane and norbornane;
the term "(cycloalkyl)alkyl" is understood to mean, according to the invention, a cycloalkyl group as defined above bonded to an alkyl group as also defined above;
the term "aryl" is understood to mean, according to the invention, an aromatic hydrocarbon group containing from 6 to 10 carbon atoms which is monocyclic or polycyclic. An aryl group can be chosen from the group consisting of phenyl, naphthyl and anthracenyl;
the term "arylalkyl" is understood to mean, according to the invention, an aryl group as defined above bonded to an alkyl group also as defined above.

According to a preferred embodiment, in the formula (F1), $R^8$ and $R^9$ constitute, together with a carbon atom to which they are bonded, an unsubstituted 5-, 6-, 7- or 8-membered aliphatic ring. According to another preferred embodiment, $R^8$ and $R^9$, which are identical or different, represent, independently of one another, a monovalent $C_1$ to $C_{12}$, preferably $C_1$ to $C_6$, alkyl group.

An inhibitor with an α-acetylenic alcohol of use according to the invention can be chosen from the group consisting of the following compounds: 1-ethynyl-1-cyclopentanol; 1-ethynyl-1-cyclohexanol (also known as ECH); 1-ethynyl-1-cycloheptanol; 1-ethynyl-1-cyclooctanol; 3-methyl-1-butyn-3-ol (also known as MBT); 3-methyl-1-pentyn-3-ol; 3-methyl-1-hexyn-3-ol; 3-methyl-1-heptyn-3-ol; 3-methyl-1-octyn-3-ol; 3-methyl-1-nonyn-3-ol; 3-methyl-1-decyn-3-ol; 3-methyl-1-dodecyn-3-ol; 3-methyl-1-pentadecyn-3-ol; 3-ethyl-1-pentyn-3-ol; 3-ethyl-1-hexyn-3-ol; 3-ethyl-1-heptyn-3-ol; 3,5-dimethyl-1-hexyn-3-ol; 3-isobutyl-5-methyl-1-hexyn-3-ol; 3,4,4-trimethyl-1-pentyn-3-ol; 3-ethyl-5-methyl-1-heptyn-3-ol; 3,6-diethyl-1-nonyn-3-ol; 3,7,11-trimethyl-1-dodecyn-3-ol (also known as TMDDO); 1,1,-diphenyl-2-propyn-1-ol; 3-butyn-2-ol; 1-pentyn-3-ol; 1-hexyn-3-ol; 1-heptyn-3-ol; 5-methyl-1-hexyn-3-ol; 4-ethyl-1-octyn-3-ol and 9-ethynyl-9-fluorenol.

An inhibitor of α,α'-acetylenic diester type can be chosen from the compounds of following formula (F2):

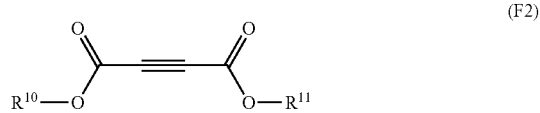

(F2)

in which the $R^{10}$ and $R^{11}$ groups, which are identical or different, represent, independently of each other, an alkyl group, a cycloalkyl group, a (cycloalkyl)alkyl group, a $C_6$ to $C_{10}$ aryl group, a $C_7$ to $C_{18}$ arylalkyl group or a silyl group.

The term "silyl" is understood to mean, according to the invention, a group of formula —$SiR_3$ in which each R symbol independently represents an alkyl group containing from 1 to 20 carbon atoms, preferably from 1 to 8 carbon atoms. A silyl group can be, for example, the trimethylsilyl group.

According to a specific embodiment, in the formula (F2), $R^{10}$ and $R^{11}$, which are identical or different, represent, independently of each other, a $C_1$ to $C_{12}$, preferably $C_1$ to $C_6$, alkyl group or the trimethylsilyl group. An inhibitor which is an α,α'-acetylenic diester of use according to the invention can be chosen from the group consisting of the following compounds: dimethyl acetylenedicarboxylate (DMAD), diethyl acetylenedicarboxylate, di(tert-butyl) acetylenedicarboxylate and bis(trimethylsilyl) acetylenedicarboxylate.

An inhibitor of ene-yne conjugated compound type can be chosen from the compounds of following formula (F3):

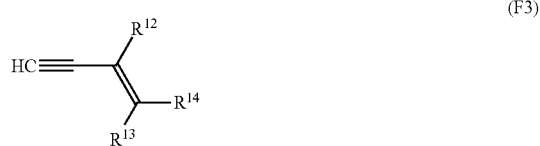

(F3)

in which:
the $R^{12}$, $R^{13}$ and $R^{14}$ groups represent, independently of one another, a hydrogen atom, an alkyl group, a cycloalkyl group, a (cycloalkyl)alkyl group, a $C_6$ to $C_{10}$ aryl group or a $C_7$ to $C_{18}$ arylalkyl group, or also at least two groups from the $R^{12}$, $R^{13}$ and $R^{14}$ groups constitute, together with the carbon atom or atoms to which they are bonded, a 5-, 6-, 7- or 8-membered aliphatic ring optionally substituted one or more times.

According to a specific embodiment, the $R^{12}$, $R^{13}$ and $R^{14}$ groups represent, independently of one another, a hydrogen atom, a $C_1$ to $C_{12}$, preferably $C_1$ to $C_6$, alkyl group or a $C_6$ to $C_{10}$ aryl group. An inhibitor which is an ene-yne conjugated compound of use according to the invention can be chosen from the group consisting of the following compounds: 3-methyl-3-penten-1-yne; 3-methyl-3-hexen-1-yne; 2,5-dimethyl-3-hexen-1-yne; 3-ethyl-3-buten-1-yne; and 3-phenyl-3-buten-1-yne. According to another specific embodiment, two groups chosen from the $R^{12}$, $R^{13}$ and $R^{14}$ groups constitute, together with the carbon atom or atoms to which they are bonded, an unsubstituted 5-, 6-, 7- or 8-membered aliphatic ring and the remaining third group represents a hydrogen atom or a $C_1$ to $C_{12}$, preferably $C_1$ to $C_6$, alkyl group. An inhibitor which is an ene-yne conjugated compound of use according to the invention can be 1-ethynyl-1-cyclohexene.

An inhibitor of α-acetylenic ketone type can be chosen from the compounds of following formula (F4):

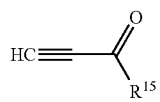

(F4)

in which: $R^{15}$ represents an alkyl group, a cycloalkyl group, a (cycloalkyl)alkyl group, a $C_6$ to $C_{10}$ aryl group or a $C_7$ to $C_{18}$ arylalkyl group, it being possible for the alkyl, cycloalkyl, (cycloalkyl)alkyl, aryl or arylalkyl groups to be optionally substituted one or more times by a chlorine, bromine or iodine atom.

According to a preferred embodiment, $R^{15}$ represents a monovalent $C_1$ to $C_{12}$, preferably $C_1$ to $C_6$, alkyl group optionally be substituted one or more times by a chlorine or bromine atom, or a cycloalkyl group, or a $C_6$ to $C_{10}$ aryl group. An inhibitor which is an α-acetylenic ketone of use according to the invention can be chosen from the group consisting of the following compounds: 1-octyn-3-one; 8-chloro-1-octyn-3-one; 8-bromo-1-octyn-3-one; 4,4-dimethyl-1-octyn-3-one; 7-chloro-1-heptyn-3-one; 1-hexyn-3-one; 1-pentyn-3-one; 4-methyl-1-pentyn-3-one; 4,4-dimethyl-1-pentyn-3-one; 1-cyclohexyl-1-propyn-3-one; benzoacetylene and (o-chlorobenzoyl)acetylene.

An inhibitor of acrylonitrile type can be chosen from the compounds of following formula (F5):

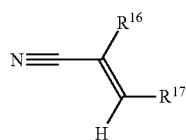

(F5)

in which: $R^{16}$ and $R^{17}$ represent, independently of each other, a hydrogen atom, a chlorine, bromine or iodine atom, an alkyl group, a cycloalkyl group, a (cycloalkyl)alkyl group, a $C_6$ to $C_{10}$ aryl group or a $C_7$ to $C_{18}$ arylalkyl group, it being possible for the alkyl, cycloalkyl, (cycloalkyl)alkyl, aryl or arylalkyl groups to be optionally substituted one or more times by a chlorine, bromine or iodine atom.

An inhibitor which is an acrylonitrile of use according to the invention can be chosen from the group consisting of the following compounds: acrylonitrile; methacrylonitrile; 2-chloroacrylonitrile; crotonnitrile and cinnamonitrile.

An inhibitor of maleate or fumarate type can be chosen from the compounds of following formulae (F6) and (F7):

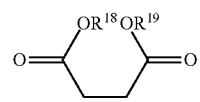

(F6)

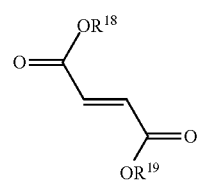

(F7)

in which: $R^{18}$ and $R^{19}$, which are identical or different, represent, independently of each other, an alkyl or alkenyl group, a cycloalkyl group, a (cycloalkyl)alkyl group, a $C_6$ to $C_{10}$ aryl group or a $C_7$ to $C_{18}$ arylalkyl group, it being possible for said alkyl, alkenyl, cycloalkyl, (cycloalkyl)alkyl, aryl and arylalkyl groups to be substituted by an alkoxy group.

The term "alkenyl" is understood to mean, according to the invention, a saturated hydrocarbon chain containing from 2 to 6 carbon atoms and comprising at least one double unsaturation. Preferably, the alkenyl group is chosen from the group consisting of a vinyl and an allyl. The term "alkoxy" is understood to mean, according to the formulae (F6) and (F7), an alkyl group as defined above bonded to an oxygen atom. An alkoxy group can be chosen from the group consisting of methoxy, ethoxy, propoxy and butoxy.

According to a specific embodiment, $R^{18}$ and $R^{19}$, which are identical or different, represent, independently of each other, a $C_1$ to $C_{12}$, preferably $C_1$ to $C_6$, alkyl or alkenyl group optionally substituted by a $C_1$ to $C_6$ alkoxy group.

An inhibitor which is a maleate or a fumarate of use according to the invention can be chosen from the group consisting of diethyl fumarate, diethyl maleate, diallyl fumarate, diallyl maleate and bis(methoxyisopropyl) maleate.

These inhibitors are added in an amount by weight of between 1 and 50 000 ppm, with respect to the weight of the total silicone composition, in particular between 10 and 10 000 ppm, preferably between 20 and 2000 ppm and more preferentially still between 800 ppm and 2000 ppm.

The medical silicone pressure-sensitive adhesive composition according to the present invention may be applied to various substrates suitable for medical application. The substrate can be a support of highly varied natures, according to the field of application.

According to a preferred embodiment, the substrate is a woven, nonwoven or knitted textile or a film of plastic. The term "nonwoven" is understood to mean any structure consisting of textile materials, such as fibers, continuous filaments or cut yarns, whatever the nature or the origin thereof, formed into a net by any means and bonded by any means, excluding the intertwining of yarns. Nonwovens are products having the appearance of textiles, are porous, are composed mainly of fibers and are manufactured by processes other than spinning, weaving, knitting or knotting.

According to another preferred embodiment, the substrate is made of plastic. A large variety of plastics can be appropriate for use as substrate according to the invention. Examples comprise: polyvinyl chloride, polypropylene, regenerated cellulose, polyethylene terephthalate (PET) and polyurethane, in particular melt-blown polyurethane. The substrate can be a perforated flexible polyurethane film or a continuous flexible polyurethane film. This flexible polyurethane film can be manufactured from melt-blown polyurethane. When the substrate is a flexible polyurethane film, the thickness will generally be between 5 and 600 µm, preferably between 5 and 250 µm and more preferably still between 10 and 100 µm.

Preferably, the substrate may be selected from paper, polyurethane, non-woven cloth and elastic cloth.

Depending on the final application, the medical silicone pressure-sensitive adhesive composition according to the present invention can be adapted to various substrates. In particular, the organopolysiloxanes A, CE and XL may be chosen such that a specific molar ratio RHAlk=tH/tAlk and a specific ratio $nH^{XL}/nH^{CE}$ may be more particularly suitable for a specific substrate.

For example, when the substrate is paper, the molar ratio RHAlk=tH/tAlk may be comprised from 4.30 to 6.00, preferably from 4.55 to 5.55; and/or the molar ratio $nH^{XL}/nH^{CE}$ may be comprised from 0.10 to 0.22, preferably from 0.12 to 0.20.

When the substrate is thermoplastic polyurethane, the molar ratio RHAlk=tH/tAlk may be comprised from 4.50 to 8.00, preferably from 4.70 to 5.70; and/or the molar ratio $nH^{XL}/nH^{CE}$ may be comprised from 0.50 to 11.0, preferably from 1.2 to 8.0.

When the substrate is non-woven cloth, the molar ratio RHAlk=tH/tAlk may be comprised from 3.50 to 8.00, preferably from 4.00 to 6.60; and/or the molar ratio $nH^{XL}/nH^{CE}$ may be comprised from 1.00 to 7.50, preferably from 1.20 to 6.50.

When the substrate is elastic cloth preferably for Kinesiology sport tape, the molar ratio RHAlk=tH/tAlk may be comprised from 4.10 to 8.00, preferably from 5.00 to 6.60; and/or the molar ratio $nH^{XL}/nH^{CE}$ may be comprised from 0.50 to 11.00, preferably from 2.00 to 8.00.

The person skilled in the art can adjust the medical silicone pressure-sensitive adhesive composition according to the final application. Generally, the medical silicone pressure-sensitive adhesive composition according to the present invention may have a dynamic viscosity of 500 to 5000 mPa·s at 25° C., preferably 800 to 3000 mPa·s at 25° C., more preferably 1000 to 2500 mPa·s at 25° C.

The medical silicone pressure-sensitive adhesive composition according to the present invention can be applied or coated to various substrates by any technique well known by the person skilled in the art. As technique for depositing the medical silicone pressure-sensitive adhesive composition according to the present invention, mention may be made, for example, of the coating techniques carried out by a knife, in particular by knife overroll, floating knife and knife over carpet, or by padding, that is to say by squeezing between two rolls, or also by licking roll, rotary machine, reverse roll or transfer, or by spraying. Mention may be made, as other coating technique, of the curtain coating technique. Curtain coating is a process for application of a coating liquid to an article or a support. Curtain coating is characterized by the formation of a freely falling curtain of a coating liquid which falls from the lip of the hopper and, under the effect of gravity, will encounter the article moving through the curtain in order to form a coating. This technique has been widely used in the field of the preparation of multilayer photosensitive silver supports (see, for example, the patents U.S. Pat. Nos. 3,508,947, 3,508,947 and EP 537 086).

Then, the medical silicone pressure-sensitive adhesive composition coated on the substrate is crosslinked, for example, at the temperature of 100° C. to 160° C., preferably 120° C. to 150° C.

Thus, a substrate coated with a silicone pressure-sensitive adhesive G is obtained by crosslinking the silicone pressure-sensitive adhesive composition according to the present invention.

MODE OF CARRYING OUT THE INVENTION

Other advantages and features of the present invention will appear on reading the following examples that are given by way of illustration and that are in no way limiting.

EXAMPLES

1. Measurement met0hods

In the following, measurement methods implemented in the examples are described.

1.1. Easy to tear

"Easy to tear" test is carried out by cutting cured PSA lamination into strips of 10 cm (length)*2.5 cm (width), taking off the release liner from PSA layer and then tearing the strip apart quickly along the width. By observing the fracture, "Easy to tear" test results can be classified into 3 grades, A=Tidy fracture and no wiredrawing when tearing, accepted B=Tough fracture and no wiredrawing when tearing, accepted C=Tough fracture and wiredrawing when tearing, unaccepted 1.2. Residual on Skin "Residual on skin" test is carried out by cutting cured PSA lamination into strips of taking off the release liner from PSA layer and adhering the PSA layer to the skin. After 4 hours under room atmosphere, by peeling off the PSA layer and checking the adherent area on skin, "Residual on skin" test results can be classified into 5 grades, A=No visible adhesive and no tacky feeling by finger, accepted B=No visible adhesive and little tacky feeling by finger, accepted C=Visible adhesive spot, unaccepted D=Visible adhesive pieces, unaccepted E=Visible adhesive on the whole adherent area, unaccepted 1.3. Anchorage on Substrate "Anchorage on substrate" test is carried out by cutting cured PSA lamination into strips of 10 cm (length)*2.5 cm (width), taking off the release liner from PSA layer, folding the tacky side to adhere two ends together and then quickly peeling them apart. By observing the adherent area on both ends, "Anchorage on substrate" test results can be classified into 4 grades, A=No change on both adherent areas, accepted B=Adhesive is broken inside on either of adherent areas, accepted C=Adhesive pieces are peeled off from substrate on either of adherent areas, unaccepted D=Adhesive is totally peeled off from substrate on either of adherent areas, unaccepted

1.4. Peel Adhesion

"Peel Adhesion" test is carried out by cutting cured PSA lamination into strips of 10 cm(length)*2.5 cm(width), taking off the release liner from PSA layer, adhering the PSA layer on a textured hard paper of 15 cm*5 cm size and laminating them with a 2 kg rubber roller two cycles; keeping the "ready to test" samples for further 20 minutes. Then, the peel test is performed on the PA1000-180 Peel Tester from Cheminstrument Co. Ltd according to FINAT FTM1. Atmosphere condition is 23° C. & 50% RH.

When the result is greater than 4 N/25 mm, accepted.

1.5. Probe Tack Test

"Probe Tack test" is carried out by cutting cured PSA lamination into strips of 2.5 cm(length)*2.5 cm(width), taking off the release liner from PSA layer; running the Tack test on the PT1000 Probe Tack Tester from Cheminstrument Co. Ltd according to ASTM D2979. Atmosphere condition is 23° C. & 50% RH When the result is greater than 1000 g/cm 2 , accepted .

1.6. Loop Tack Test

"Loop Tack test" is carried out by cutting cured PSA lamination into strips of taking off the release liner from PSA layer. The test is performed on the LT1000 Loop Tack Tester from Cheminstrument Co. Ltd according to FINAT FTM9. Atmosphere condition is 23° C. & 50% RH.

When the result is greater than 500 g/25mm$^2$ , accepted

1.7. Reposition Property

"Reposition property" test is carried out by using Loop Tack or Probe Tack test. The Tack test is repeated with the same sample until 40% of Tack is lost compared with the $1^{st}$ result, then the number of cycles is recorded as indicator of reposition property. Atmosphere condition is 23° C. & 50% RH.

When the result is greater than 4, accepted.

1.8. Release Force

"Release Force" test is carried out by cutting cured PSA lamination into strips of taking off the release liner from PSA layer, adhering the PSA layer on a standard fluorine release of 15 cm*5 cm size, and laminating them with a 2 kg rubber roller two cycles; keeping the "ready to test" samples for further 20 minutes. Then, the release force is determined when PSA is peeled off from the chosen liner by the PA1000-180 Peel Tester from Cheminstrument Co. Ltd according to FINAT FTM3. Atmosphere condition is 23° C. & 50% RH.

When the result is less than 5 g/25mm, accepted.

2. Preparation of the Composition of the Invention

2.1. Raw Materials used in the Examples are Listed in the Following Table 1:

TABLE 1

| Raw materials | Chemical description or structure |
|---|---|
| organopolysiloxane A | $M^{vi}D_xM^{vi}$, Mw = 800 000 g/mol, Vinyl content = 0.013 wt %, Only vinyl terminated, consistency = 800 mm/10 |
| organopolysiloxane resin B | $M_xQ_yQz^{OH}$ resin, Mw = 5,500, x/(y + z) = 0.9, OH = 1.0 wt % |
| crosslinker XL | $M^HD^H_nD_mM^H$, Viscosity = 300 mPa · s, Si—H content = 4.70 wt % |
| extender CE | $M^HD_yM^H$, Viscosity = 8.0 mPa · s, Si—H content = 5.51 wt % |
| catalyst D | Pt content = 0.2 wt %, dissolved in vinyl terminated polysiloxane of 350 mPa · s |
| solvent E | Ethyl Acetate |
| inhibitor F | 1-Ethynylcyclohexanol (ECH) |

2.2. "Ready to Coat" Solution Preparation 37 g organopolysiloxane resin B and 0.12 g ECH are dissolved in 40 g ethyl acetate homogeneously, then 23 g organopolysiloxane A is introduced into the above ethyl acetate solution with stirring until all components mixed homogeneously, thus obtaining a basic composition.

A composition according to the present invention is obtained by weighting 100 g the basic composition into 50 g ethyl acetate, then adding Crosslinker XL and Extender CE in amounts as shown in the following tables, mixing them homogeneously, and then adding Catalyst D in amount as shown in the following tables, mixing the mixture to obtain a homogeneous solution, called as a "ready to use" solution.

3. Application on Substrate

3.1 Application 1, Paper Tape

Process is to first coat the "ready to use" solution on a fluorine silicone release liner, make dry PSA thickness 30 µm, and then put it in fume hood for 10 mins, and then put it in 120° C. oven for 5 mins. Once the cured layer is taken out of oven, the PSA layer is covered with non-woven paper and then the resulting "sandwich" type assembly is laminated twice with auto laminator under 30 psi pressure. The PSA will be transferred to the required substrate side. The cured PSA lamination is obtained.

TABLE 2

Examples of coating on paper substrate

| Paper Substrate | EXM.1 | EXM.2 | EXM.3 | EXM.4 | EXM.5 | EXM.6 | EXM.7 | EXM.8 | EXM.9 | EXM.10 | EXM.11 | EXM.12 |
|---|---|---|---|---|---|---|---|---|---|---|---|---|
| Basic composition | 100 | 100 | 100 | 100 | 100 | 100 | 100 | 100 | 100 | 100 | 100 | 100 |
| XL 300 mPa·s | 0.205 | 0.232 | 0.262 | 0.3 | 0.262 | 0.28 | 0.295 | 0.318 | 0.209 | 0.272 | 0.33 | 0.376 |
| CE 8 mPa·s | 1.365 | 1.548 | 1.308 | 1.5 | 1.138 | 1.22 | 1.285 | 1.382 | 0.791 | 1.028 | 1.25 | 1.424 |
| catalyst D | 1.2 | 1.2 | 1.2 | 1.2 | 1.2 | 1.2 | 1.2 | 1.2 | 1.2 | 1.2 | 1.2 | 1.2 |
| $nH^{XL}/nH^{CE}$ | 0.13 | 0.13 | 0.17 | 0.17 | 0.2 | 0.2 | 0.2 | 0.2 | 0.23 | 0.23 | 0.23 | 0.23 |
| RHAlk = tH/tAlk | 4.8 | 5.46 | 4.79 | 5.49 | 4.25 | 4.55 | 4.8 | 5.16 | 3.03 | 3.94 | 4.79 | 5.46 |
| Easy Tear | B | B | A | B | A | A | B | A | A | A | C | C |
| Reposition Property | 7 | 6 | 7 | 8 | 10 | 8 | 6 | 5 | 8 | 8 | 7 | 6 |
| Residual on Skin | B | B | A | A | D | B | A | A | E | E | D | A |
| Anchorage on Substrate | A | B | A | A | A | A | A | B | A | A | A | D |
| Peel Adhesion N/25 mm | 8.9 | 9.8 | 9.8 | 8.4 | / | / | 10.4 | 10 | / | / | / | / |
| Probe TACK g/cm² | 2525 | 2193 | 1832 | 1520 | / | / | 1910 | 1910 | / | / | / | / |

Exm. 5 vs Exm. 6 to 8: RHAlk < 4.30 (though the same $nH^{XL}/nH^{CE}$) leads to weak cohesion (weak crosslinking) and leaves spot residual on skin.

Exm. 12 vs Exm. 2&4: $nH^{XL}/nH^{CE}$ > 0.22 (though the same RHAlk) leads to so strong cohesion that the adhesion to the substrate is too weak and the anchorage test fails.

Exm 9 to 12: $nH^{XL}/nH^{CE}$ > 0.22 (no matter what the value of RHAlk is) leads to so strong cohesion that the adhesion to the substrate is too weak and the anchorage test fails, even worse, some PSA pieces remain on skin after the PSA tape is peeled off.

It can be seen that in the ranges of $nH^{XL}/nH^{CE}$ of 0.10 to 0.22 & RHAlk of 4.3 to 6.0, the good properties are obtained on paper substrate, that is, easy to tear apart, good reposition property and water resistance, good anchorage on substrate, low skin irritation.

3.2 Application 2, TPU Transparent Patch

Process is to coat the "ready to use" solution on a TPU film (with polyethylene coated Kraft paper as backing), to make dry PSA thickness 30 μm, and then put it in 60° C. oven asap for 1 min, and then put it in 120° C. oven for 5 mins. After the cured layer is taken out of oven, the cured PSA layer and silicone fluorine release liner (Si-F liner) are laminated twice under 30 psi pressure. The cured PSA lamination is obtained.

TABLE 3

Examples of coating on TPU substrate

| TPU Film Substrate | | EXM. 13 | EXM. 14 | EXM. 15 | EXM. 16 | EXM. 17 | EXM. 18 | EXM. 19 |
|---|---|---|---|---|---|---|---|---|
| Basic Composition | | 100 | 100 | 100 | 100 | 100 | 100 | 100 |
| XL | 300 mPa·s | 0.267 | 0.417 | 0.42 | 1.008 | 1.152 | 1.19 | 1.33 |
| CE | 8 mPa·s | 1.333 | 2.083 | 1.4 | 0.672 | 0.768 | 0.51 | 0.57 |
|  | 300 mPa·s | 0 | 0 | 0 | 0 | 0 | 0 | 0 |
| Catalyst D | | 1.2 | 1.2 | 1.2 | 1.2 | 1.2 | 1.2 | 1.2 |
| $nH^{XL}/nH^{CE}$ | | 0.17 | 0.17 | 0.26 | 1.3 | 1.3 | 2.01 | 2.01 |
| RHAlk = tH/tAlk | | 4.88 | 7.62 | 5.49 | 4.79 | 5.48 | 4.79 | 5.36 |
| Release Force to Si-F liner g/25 mm | | Uncured | 0.7 | 1.8 | 0.8 | 0.7 | 0.9 | 2.4 |
| Residual on Skin | | E | D | E | A | A | A | A |
| Peel Adhesion N/25 mm | | / | / | / | 3.92 | 4.62 | 4.11 | 4.35 |
| Loop Tack g/25 mm² | | / | / | / | 1960 | 1892 | 1604 | 1606 |

| TPU Film Substrate | | EXM. 20 | EXM. 21 | EXM. 22 | EXM. 23 | EXM. 24 | EXM. 25 | EXM. 26 |
|---|---|---|---|---|---|---|---|---|
| Basic Composition | | 100 | 100 | 100 | 100 | 100 | 100 | 100 |
| XL | 300 mPa·s | 1.38 | 1.592 | 1.809 | 1.209 | 1.395 | 1.655 | 1.341 |
| CE | 8 mPa·s | 0.46 | 0.398 | 0.201 | 0.091 | 0.105 | 0.125 | 0 |
|  | 300 mPa·s | 0 | 0 | 0 | 0 | 0 | 0 | 5.199 |
| Catalyst D | | 1.2 | 1.2 | 1.2 | 1.2 | 1.2 | 1.2 | 1.2 |
| $nH^{XL}/nH^{CE}$ | | 2.59 | 3.45 | 7.77 | 11.47 | 11.47 | 11.47 | 2.01 |
| RHAlk = tH/tAlk | | 5.16 | 5.51 | 5.5 | 3.5 | 4.03 | 4.79 | 5.36 |
| Release Force to Si-F liner g/25 mm | | 1.1 | 0.7 | 1.9 | 0.6 | 0.7 | 0.8 | 0.031 |
| Residual on Skin | | A | A | A | D | C | C | A |
| Peel Adhesion N/25 mm | | 3.92 | 3.73 | 4.28 | / | / | / | 4.028 |
| Loop Tack g/25 mm² | | 1410 | 1338 | 1261 | / | / | / | 1702 |

Exm. 13 to 15: $nH^{XL}/nH^{CE} < 0.50$ leads to weak cohesion or makes the curing impossible and cohesion failure results in adhesive spot residual on skin after the PSA is peeled off.

Exm. 23 to 25: $nH^{XL}/nH^{CE} > 11$ leads to too strong cohesion and causes the adhesion to substrate too weak and anchorage failure occurs when the PSA patch is peeled off from skin. Some adhesive pieces are transferred from substrate to skin.

It can be seen that in the ranges of $nH^{XL}/nH^{CE}$ of 0.5 to 11 & RHAlk of 4.5 to 8.0, the good properties are obtained on TPU substrate, that is, good air permeability, good shear performance and water resistance, low irritation for long term wearing, good anchorage on substrate. Specially, PU primer is not required.

3.3 Application 3, Non-Woven Cloth Tape

Substrate is non-woven cloth.

The process is to coat the "ready to use" solution on a fluorine release liner, make dry PSA thickness 36 μm, and put it in fume hood for 10 mins, and then laminate it with non-woven cloth twice under 30 psi pressure, then put the resulting sandwich type assembly in 120° C. oven for 5 mins and take it out at the end. The PSA will be transferred to the required substrate side. The cured PSA lamination is obtained.

TABLE 4

Examples of coating on non-woven cloth substrate

| Non-woven Cloth Substrate | | EXM. 27 | EXM. 28 | EXM. 29 | EXM. 30 | EXM. 31 | EXM. 32 | EXM. 33 | EXM. 34 |
|---|---|---|---|---|---|---|---|---|---|
| Basic Composition | | 100 | 100 | 100 | 100 | 100 | 100 | 100 | 100 |
| XL | 300 mPa · s | 0.69 | 0.945 | 1.12 | 1.152 | 1.099 | 1.261 | 1.33 | 1.38 |
| CE | 8 mPa · s | 0.69 | 0.945 | 1.12 | 0.768 | 0.591 | 0.679 | 0.57 | 0.46 |
| catalyst D | | 1.2 | 1.2 | 1.2 | 1.2 | 1.2 | 1.2 | 1.2 | 1.2 |
| $nH^{XL}/nH^{CE}$ | | 0.86 | 0.86 | 0.86 | 1.3 | 1.6 | 1.6 | 2.01 | 2.59 |
| RHAlk = tH/tAlk | | 4 | 5.49 | 6.5 | 5.48 | 4.8 | 5.49 | 5.36 | 5.15 |
| Release Force to Si-F liner g/25 mm | | 91.7 | 78.8 | 65.8 | 77.7 | 81.9 | 78.1 | 77.4 | 77.6 |
| Residual on Skin | | E | C | C | B | A | A | A | A |
| Peel Adhesion N/25 mm | | 1.39 | 3.06 | 2.72 | 2.98 | 2.51 | 3.01 | 2.46 | 2.57 |
| Loop Tack g/25 mm² | | 383 | 475 | 395 | 468 | 520 | 480 | 408 | 445 |

| Non-woven Cloth Substrate | | EXM. 35 | EXM. 36 | EXM. 37 | EXM. 38 | EXM. 39 | EXM. 40 | EXM. 41 |
|---|---|---|---|---|---|---|---|---|
| Basic Composition | | 100 | 100 | 100 | 100 | 100 | 100 | 100 |
| XL | 300 mPa · s | 1.56 | 1.5 | 1.658 | 1.285 | 1.285 | 1.575 | 1.575 |
| CE | 8 mPa · s | 0.39 | 0.3 | 0.332 | 0.175 | 0.175 | 0.175 | 0.175 |
| catalyst D | | 1.2 | 1.2 | 1.2 | 1.2 | 1.2 | 1.2 | 1.2 |
| $nH^{XL}/nH^{CE}$ | | 3.45 | 4.32 | 4.32 | 6.33 | 6.33 | 7.77 | 7.77 |
| RHAlk = tH/tAlk | | 5.4 | 5.13 | 5.48 | 4 | 6.5 | 4.8 | 5.49 |
| Release Force to Si-F liner g/25 mm | | 74.5 | 78.8 | 74.2 | 84.6 | 59.6 | XXX | XXXX |
| Residual on Skin | | A | A | B | A | A | D | D |
| Peel Adhesion N/25 mm | | 2.41 | 2.3 | 2.12 | 2.53 | 1.69 | / | / |
| Loop Tack g/25 mm² | | 385 | 420 | 390 | 412 | 360 | / | / |

Exm. 27 to 29: $nH^{XL}/nH^{CE} < 1.0$ leads to weak cohesion, and causes adhesive spot residual on skin after the PSA tape is peeled off.

Exm. 40 to 41: $nH^{XL}/nH^{CE} > 7.5$ leads to too high release force from liner and too strong cohesion, resulting in bad anchorage on substrate (residual PSA pieces on skin due to the weak adhesion to substrate).

It can be seen that in the ranges of $nH^{XL}/nH^{CE}$ of 1.00 to 7.50 & RHAlk of 3.5 to 8.0, the good properties are obtained on non-woven cloth substrate, that is, good air permeability, good shear performance and water resistance, good anchorage on substrate.

3.4 Application 4, Elastic Cloth Tape

Same process is done as in Application 3, so as to obtain the cured PSA lamination. Substrate is elastic cloth made of cotton or nylon.

TABLE 5

Examples of coating on elastic cloth substrate

| Elastic Cloth Substrate | EXM.42 | EXM.43 | EXM.44 | EXM.45 | EXM.46 | EXM.47 | EXM.48 | EXM.49 |
|---|---|---|---|---|---|---|---|---|
| Basic Composition | 100 | 100 | 100 | 100 | 100 | 100 | 100 | 100 |
| XL    300 mPa·s | 0.267 | 0.35 | 1.38 | 1.208 | 1.967 | 1.314 | 2.133 | 1.655 |
| CE      8 mPa·s | 1.333 | 1.75 | 0.46 | 0.242 | 0.393 | 0.146 | 0.237 | 0.125 |
| catalyst D | 1.2 | 1.2 | 1.2 | 1.2 | 1.2 | 1.2 | 1.2 | 1.2 |
| $nH^{XL}/nH^{CE}$ | 0.17 | 0.17 | 2.59 | 4.32 | 4.32 | 7.77 | 7.77 | 11.47 |
| RHAlk = tH/tAlk | 4.88 | 6.4 | 5.16 | 4 | 6.5 | 4 | 6.5 | 4.79 |
| RF to Si-F liner g/25 mm | XXXX | 77.7 | 55.9 | 64.6 | 32.3 | 68.2 | 53.5 | 37.2 |
| Residual on Skin | E | C | A | D | A | E | A | A |
| Peel Adhesion N/25 mm | 1.01 | 2.23 | 1.73 | 1.5 | 1.59 | 2.3 | 1.85 | 1.72 |
| Loop Tack g/25 mm² | 200 | 288 | 230 | 245 | 188 | 230 | 173 | XXX |

Exm. 45 vs Exm. 46, Exm. 47 vs Exm. 48: RHAlk < 4.10 leads to weak cohesion, resulting in adhesive spot residual on skin after the PSA tape is peeled off.
Exm. 42 vs Exm. 44, Exm. 43 vs Exm. 46: $nH^{XL}/nH^{CE}$ > 0.5 leads to weak cohesion, resulting in adhesive spot residual on skin after the PSA tape is peeled off.

It can be seen that in the ranges of $nH^{XL}/nH^{CE}$ of 0.5 to 11 & RHAlk of 4.1 to 8.0, the good properties are obtained on elastic cloth substrate, that is, good sweat resistance, reposition property, air permeability, low irritation for long-term dressing.

The invention claimed is:

1. A medical silicone pressure-sensitive adhesive composition comprising:
   at least one organopolysiloxane A comprising, per molecule, at least two $C_2$ to $C_6$ alkenyl radicals each bonded to a silicon atom,
   at least one organopolysiloxane resin B comprising hydroxyl groups bonded to silicone atoms,
   at least one organopolysiloxane crosslinker XL having at least three hydrogen atoms bonded to silicone atoms,
   at least one organopolysiloxane extender CE having exactly two terminal-hydrogen atoms bonded to silicone atoms,
   at least one hydrosilylation catalyst D,
   at least one solvent E,
   at least one hydrosilylation inhibitor F,
   wherein the organopolysiloxanes A, CE and XL are chosen such that the molar ratio RHAlk=tH/tAlk is from 3.5 to 8.0; and $nH^{XL}/nH^{CE}$ is from 0.13 to 11, with:
   tH=number of moles of hydrogen atom directly bonded to a silicon atom of the organopolysiloxanes XL and CE;
   tAlk=number of moles of alkenyl directly bonded to a silicon atom of the organopolysiloxane A;
   $nH^{XL}$=number of moles of hydrogen atom directly bonded to a silicon atom of the organopolysiloxane XL; and
   $nH^{CE}$=number of moles of hydrogen atom directly bonded to a silicon atom of the organopolysiloxane CE.

2. The composition according to claim 1, wherein the organopolysiloxane A is an organopolysiloxane gum having a consistency at 25° C. of from 200 mm/10 to 2000 mm/10 and/or an organopolysiloxane gum having a viscosity greater than 600 000 mPa·s at 25° C. and/or an organopolysiloxane gum having an alkenyl content of from 0.001 wt % to 0.5 wt %, based on the total weight of the organopolysiloxane A.

3. The composition according to claim 1, wherein the molar ratio RHAlk=tH/tAlk is from 4.30 to 6.00; and/or the molar ratio $nH^{XL}/nH^{CE}$ can be from 0.10 to 0.22, and wherein said composition is coated on paper.

4. The composition according to claim 1, wherein the molar ratio RHAlk=tH/tAlk is from 4.50 to 8.00; and/or the molar ratio $nH^{XL}/nH^{CE}$ can be from 0.50 to 11.0, and wherein said composition is coated on polyurethane.

5. The composition according to claim 1, wherein the molar ratio RHAlk=tH/tAlk is from 3.50 to 8.00; and/or the molar ratio $nH^{XL}/nH^{CE}$ can be from 1.00 to 7.50, and wherein said composition is coated on non-woven cloth.

6. The composition according to claim 1, wherein the molar ratio RHAlk=tH/tAlk is from 4.10 to 8.00; and/or the molar ratio $nH^{XL}/nH^{CE}$ can be from 0.50 to 11.00, and wherein said composition is coated on elastic cloth.

7. The composition according to claim 1, wherein the organopolysiloxane crosslinker XL and organopolysiloxane extender CE are introduced as a mixture.

8. The composition according claim 1, wherein the organopolysiloxane crosslinker XL has a dynamic viscosity of from 40 mPa·s to 1000 mPa·s at 25° C.; and/or the organopolysiloxane extender CE has a dynamic viscosity of from 1 mPa·s to 1000 mPa·s at 25° C.

9. The composition according claim 1, wherein the organopolysiloxane resin B is a hydroxylated silicone resin of $MQ^{(OH)}$, $MQQ^{(OH)}$ or $MM^{Vi}Q^{(OH)}$ type and comprises from 0.1 wt % to 4 wt %, of hydroxyl group with respect to the dry weight of organopolysiloxane resin B, and/or the ratio of M units and Q units is from 0.5 to 1.2.

10. The composition according claim 1, wherein the weight ratio between organopolysiloxane resin B and organopolysiloxane A is from 0.8 to 2.5.

11. A method of coating a substrate, the method comprising coating the substrate with the composition according claim 1.

12. A coated substrate obtained by the method according to claim 11.

13. A substrate coated with a silicone pressure-sensitive adhesive obtained by crosslinking the silicone pressure-sensitive adhesive composition according to claim 1.

14. A skin-adhesive article comprising a substrate coated, continuously or noncontinuously, on at least one of its two faces with a silicone pressure-sensitive adhesive obtained by crosslinking the medical silicone pressure-sensitive adhesive composition according to claim 1.

15. The composition according to claim 2, wherein the organopolysiloxane gum has a consistency at 25° C. of from 300 mm/10 to 1800 mm/10.

16. The composition according to claim 2, wherein the organopolysiloxane gum has a consistency at 25° C. of from 500 mm/10 to 1500 mm/10.

17. The composition according to claim 2, wherein the organopolysiloxane gum has a viscosity greater than 1 000 000 mPa·s at 25° C.

18. The composition according to claim 2, wherein the organopolysiloxane gum has an alkenyl content of from 0.005 wt % to 0.025 wt %.

19. The composition according to claim 2, wherein the organopolysiloxane gum has an alkenyl content of from 0.008 wt % to 0.018 wt %.

20. The composition according to claim 3, wherein the molar ratio RHAlk=tH/tAlk is from 4.55 to 5.55.

21. The composition according to claim 3, wherein the molar ratio $nH^{XL}/nH^{CE}$ can be from 0.12 to 0.20.

22. The composition according to claim 4, wherein the molar ratio RHAlk=tH/tAlk is from 4.70 to 5.70.

23. The composition according to claim 4, wherein the molar ratio $nH^{XL}/nH^{CE}$ can be from 1.2 to 8.0.

24. The composition according to claim 4, wherein the composition is coated on polyurethane that is a thermoplastic polyurethane.

25. The composition according to claim 5, wherein the molar ratio RHAlk=tH/tAlk is from 4.00 to 6.60.

26. The composition according to claim 5, wherein the molar ratio $nH^{XL}/nH^{CE}$ can be from 1.20 to 6.50.

27. The composition according to claim 6, wherein the molar ratio RHAlk=tH/tAlk is from 5.00 to 6.60.

28. The composition according to claim 6, wherein the molar ratio $nH^{XL}/nH^{CE}$ can be from 2.00 to 8.00.

29. The composition according to claim 8, wherein the dynamic viscosity of the crosslinker XL is from 50 mPa·s to 750 mPa·s at 25° C.

30. The composition according to claim 8, wherein the dynamic viscosity of the crosslinker XL is from 60 mPa·s to 500 mPa·s at 25° C.

31. The composition according to claim 8, wherein the dynamic viscosity of the extender CE is from 5 mPa·s to 500 mPa·s at 25° C.

32. The composition according to claim 8, wherein the dynamic viscosity of the extender CE is from 5 mPa·s to 300 mPa·s at 25° C.

33. The composition according to claim 9, wherein the amount of the hydroxyl group in the resin B is from 0.3 wt % to 2.0 wt %.

34. The composition according to claim 9, wherein the amount of the hydroxyl group in the resin B is from 0.5 wt % to 1.5 wt %.

35. The composition according to claim 9, wherein the ratio of M units and Q units is from 0.6 to 0.9.

36. The composition according to claim 10, wherein the weight ratio of resin B and A is from 1.0 to 2.0.

* * * * *